(12) United States Patent
Fehr et al.

(10) Patent No.: US 7,324,892 B2
(45) Date of Patent: Jan. 29, 2008

(54) PARAMETER COORDINATION IN A VEHICULAR COMMUNICATION NETWORK

(75) Inventors: Walton L. Fehr, Mundelein, IL (US); Patrick D. Jordan, Austin, TX (US); Desmond Hill, Warwickshire (GB)

(73) Assignee: Temic Automotive of North America, Inc., Deer Park, IL (US)

( * ) Notice: Subject to any disclaimer, the term of this patent is extended or adjusted under 35 U.S.C. 154(b) by 0 days.

(21) Appl. No.: 11/101,960

(22) Filed: Apr. 8, 2005

(65) Prior Publication Data

US 2006/0227793 A1    Oct. 12, 2006

(51) Int. Cl.
G06F 19/00    (2006.01)
H04L 1/00    (2006.01)

(52) U.S. Cl. ...................... 701/115; 370/241
(58) Field of Classification Search ............... 701/115, 701/102, 101, 1; 370/241, 242, 217
See application file for complete search history.

(56) References Cited

U.S. PATENT DOCUMENTS 6,747,365 B2    6/2004    Reinold

| | | |
|---|---|---|
| 2003/0043779 A1 | 3/2003 | Remboski |
| 2003/0043793 A1 | 3/2003 | Reinold |
| 2004/0003227 A1 | 1/2004 | Reinold |
| 2004/0213295 A1 | 10/2004 | Fehr |
| 2006/0083172 A1* | 4/2006 | Jordan et al. ............... 370/241 |
| 2006/0083173 A1* | 4/2006 | Jordan et al. ............... 370/242 |

* cited by examiner

Primary Examiner—Hieu T. Vo (57) ABSTRACT

A system and method for coordinating parameters in a switch fabric network (22) of a vehicle (20). The network (22) has a plurality of nodes (24) that are interconnected by communication links for the transmission of data packets there between. Events in the vehicle (20) may be handled in connection with a vehicle parameter. One example of a vehicle parameter that may be used in the vehicle is the rotation of a crank shaft in the vehicle. An application uses that information to make a determination whether change a setting of a device in the vehicle (20). If so, the application generates a command data packet and transmits the command data packet over the switch fabric network (22). The command data packet transmitted by the application includes the new setting for the device along with a value of the vehicle parameter when the new setting should occur in the device. A node (24) associated with the device receives the data packet and acts on the information in the command data packet based on the value of the vehicle parameter within the data packet.

20 Claims, 9 Drawing Sheets

PARAMETER COORDINATION IN A VEHICULAR COMMUNICATION NETWORK

FIELD OF THE INVENTION

This invention in general relates to vehicular communication networks and particularly to a system and method for handling events in a vehicular network based on vehicle parameters.

BACKGROUND OF THE INVENTION

The commonly assigned United States patent application entitled "Vehicle Active Network," Ser. No. 09/945,581, Publication No. US 20030043793, filed Aug. 31, 2001, the disclosure of which is hereby expressly incorporated herein by reference, introduces the concept of an active network that includes a switch fabric. The switch fabric is a web of interconnected switching devices or nodes. Control devices, sensors, actuators and the like are coupled to the switch fabric, and the switch fabric facilitates communication between these coupled devices.

The coupled devices may be indicator lights, vehicle control devices, vehicle safety components, and comfort and convenience components. A command to actuate a device or devices may be generated by a computing element coupled to the switch fabric and is communicated to the device or devices via the switch fabric. The command may require coordinated activation of two or more devices. However, the switch fabric may be a packet based communication medium making coordinating simultaneous events difficult.

United States patent application entitled "Method and Apparatus for Time Synchronizing an In-Vehicle Network," Ser. No. 10/424,644, Publication No. US 20040213295, filed Apr. 28, 2003, the disclosure of which is hereby expressly incorporated herein by reference, introduces time synchronization within a vehicular switch fabric network and illustrates the difficulty with capturing data from multiple sensors at the same time. For example, it may be necessary to communicate various control parameters from a number of engine sensors to an engine control application running somewhere in the network so that it may then issue commands for the control of the engine. For example, to detect misfire, the engine controller may receive data from several oxygen sensors, the crankshaft position sensor and potentially other sensors. To be certain that the misfire is detected for the correct engine cylinder so that control parameters may be varied to correct the misfire, the data must arrive to the engine controller in a coordinated manner or have a reliable time indication. Unless each of the sensors are time synchronized, there is no way to accurately time stamp the data packets or to effectively communicate them to the engine controller in a coordinated manner.

Another problem may involve the need for multiple devices to be activated at the same time or at a predefined time in the future. For example, there is a need to illuminate the left, right and center high-mounted brake lights on an automobile. Each of the brake lights should appear to illuminate substantially simultaneously. Assume that the lights are coupled to the switch fabric. The command to illuminate the lights may be generated by a braking control application running in a computing device, which is also coupled to the switch fabric. The command is communicated from the braking control application to the three brake lights. However, the command may take different incremental amounts of time based upon the paths the command takes through the network to arrive at each of the three brake lights. If the brake lights act on the command when received, the lights may not appear to come on simultaneously. The command may give a time at which to activate, but if each of the brake lights are not time synchronized, they still will not actuate at the same coordinated time.

It is, therefore, desirable to provide a system and method to overcome or minimize most, if not all, of the preceding problems especially in the area of handling events in a vehicular network.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a system and method for coordinating parameters in a switch fabric network of a vehicle. The network has a plurality of nodes that are interconnected by communication links for the transmission of data packets there between. As explained in more detail below, in sum, an application in a processing node in the network may receive sampled data from sensors over the switch fabric network. The sampled data can be associated with a value of a vehicle parameter. One example of a vehicle parameter is the rotation of a crank shaft in the vehicle. The application uses that information to make a determination whether an actuator, in a different part of the switch fabric network, needs a new setting. If so, the application generates a command data packet and transmits the command data packet over the switch fabric network.

The command data packet transmitted by the application includes the new setting for the actuator along with a value of the vehicle parameter when the new setting should occur in the actuator. A node associated with the actuator receives the data packet and acts on the information in the command data packet based on the value of the vehicle parameter within the data packet.

Figure 1:
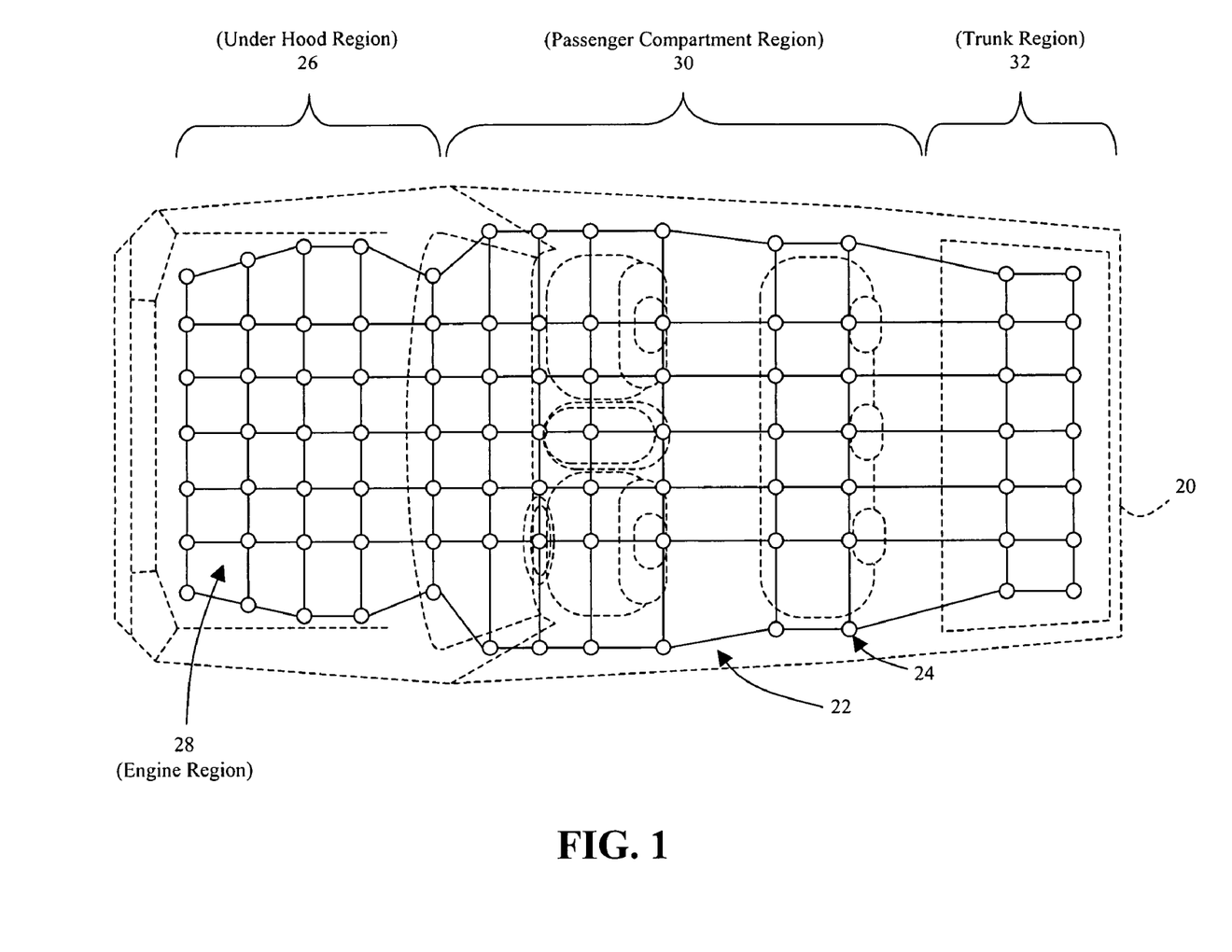
FIG. 1 is a topology of one embodiment of a switch fabric network embedded in a vehicle.

Now, turning to the drawings, FIG. 1 illustrates a vehicle 20 including a switch fabric network 22 to which various nodes 24 are coupled together. Each node 24 may comprise of, or be connected to, vehicle elements such as sensors, processors, and actuators used in connection with various vehicle functional systems and sub-systems, such as, but not limited to, diagnostics, control-by-wire applications for throttle, braking and steering control, adaptive suspension, power accessory control, communications, entertainment, and the like.

The nodes 24, or vehicle elements connected thereto, are particularly adapted to provide one or more functions associated with the vehicle 20. They may be data producing, such as a sensor, data consuming, such as an actuator, or processing, which both produces and consumes data. Of course, an actuator, typically a data-consuming device, may also produce data, for example where the actuator produces data indicating it has achieved the instructed state, or a sensor may consume data, for example, where it is provided instructions for the manner of function. Data produced by or provided to a node 24, and carried by the switch fabric network 22, may be independent of the function of the vehicle element itself.

The nodes 24 in the switch fabric network 22 are packet switches and connected together to define a plurality of communication paths within the vehicle 20. The communication paths permit multiple simultaneous peer-to-peer, one-to-many, many-to-many, etc. communications between the nodes 24. One of the main advantages of the switch fabric network 22 is that there are multiple possible paths between any two of the nodes 24 in the network. In operation, a single path through the switch fabric network 22 may carry all of a single data communication between vehicle devices, or several communication paths may carry portions of the data communication. Subsequent communications may use the same path or other paths as dictated by the then state of the network 22. This provides reliability and speed advantages over bus architectures that provide single communication paths between devices, and hence are subject to failure with failure of the single path. Moreover, communications between other of the vehicle devices may occur simultaneously using the communication paths within the switch fabric network 22.

The communication links between nodes 24 in the switch fabric network 22 may comply with transmission control protocol/Internet (TCP/IP), asynchronous transfer mode (ATM), Infiniband, RapidIO, or other packet data protocols. As such, the network 22 utilizes data packets, having fixed or variable length, defined by the applicable protocol. For example, if the switch fabric network 22 uses asynchronous transfer mode (ATM) communication protocol, ATM standard data cells are used.

Vehicle devices connected to the nodes 24 need not be discrete devices. Instead, the devices may be systems or subsystems of the vehicle and may include one or more legacy communication media, i.e., legacy bus architectures such as the Controller Area Network (CAN) protocol, the SAE J1850 Communication Standard, the Local Interconnect Network (LIN) protocol, the FLEXRAY Communications System Standard, Media Oriented Systems Transport or MOST Protocol, or similar bus structures. In such embodiments, the respective interface may be configured as a proxy or gateway to permit communication between the switch fabric network 22 and the legacy device.

Moreover, in one embodiment, as illustrated in FIG. 1, the switch fabric network 22 may uniformly blanket the entire vehicle 20 across different regions of the vehicle: an under hood region 26 having an engine region 28, a passenger compartment region 30, and a trunk region 32. The purpose of FIG. 1 is to illustrate the present invention. One of ordinary skill in the art with the benefit of the present application will realize that the switch fabric network 22 in FIG. 1 may be configured with a variety of configuration and topologies.

Figure 2:
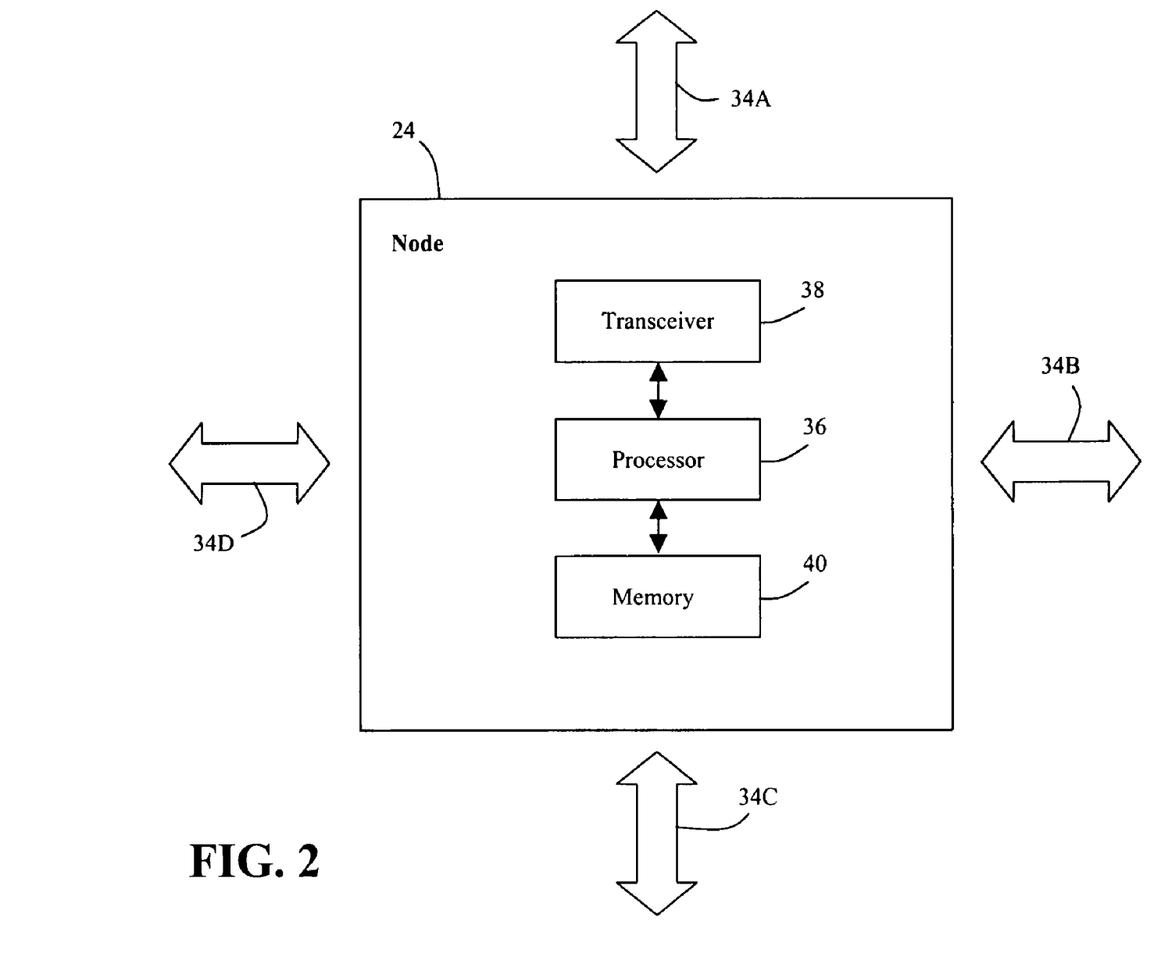
FIG. 2 is a block diagram of one embodiment of a node in the switch fabric network embedded in the vehicle.

FIG. 2 illustrates the functionality and the adaptability of a node 24 in the switch fabric network 22. In one embodiment, a node 24 may have a plurality of input/output ports 34A–D although separate input and output ports could also be used. Various configurations of the node 24 having more or fewer ports may be used in the network 22 depending on the application. The nodes 24 include a processor 36, at least one transceiver 38, and a memory 40. The processor 36 is configured to execute instructions from software components residing in the memory 40. Although the processor 36 and memory 40 are shown to be integrated with the node 24, in other applications, the processor 36 and memory 40 may be located at other places in the switch fabric network 22. The memory 40 contains a set of software components to operate the nodes 24 for normal data communications and operation within the switch fabric network 22. The memory 40 may also be used by the nodes to store updatable vehicle parameters for coordinating parameters and handling events as will be described in more detail below.

Referring back to FIG. 1, an application may be running in a processor in a node 24 somewhere in the switch fabric network 22. The application in the node 24 may need information from sensors associated located elsewhere in the network 22. Data packets of information may be transmitted from the sensors when a situation monitored by the sensors changes to a state or a level (event based) or at some predetermined time (periodic). The data packet would then travel through the network 22 along a path determined by an overall routing strategy. The data packet would continue to hop through the network 22 from node to node until it reached the node 24 where the application needing the information is running.

The application in the node 24 may use the new sensor information to construct a control data packet for another node associated with an actuator. The node 24 would then transmit the control data packet into the network 22. The control data packet may hop from node to node until it reaches its destination—the node with the actuator. The actuator would then use the control data packet to properly activate the actuator.

Figure 3:
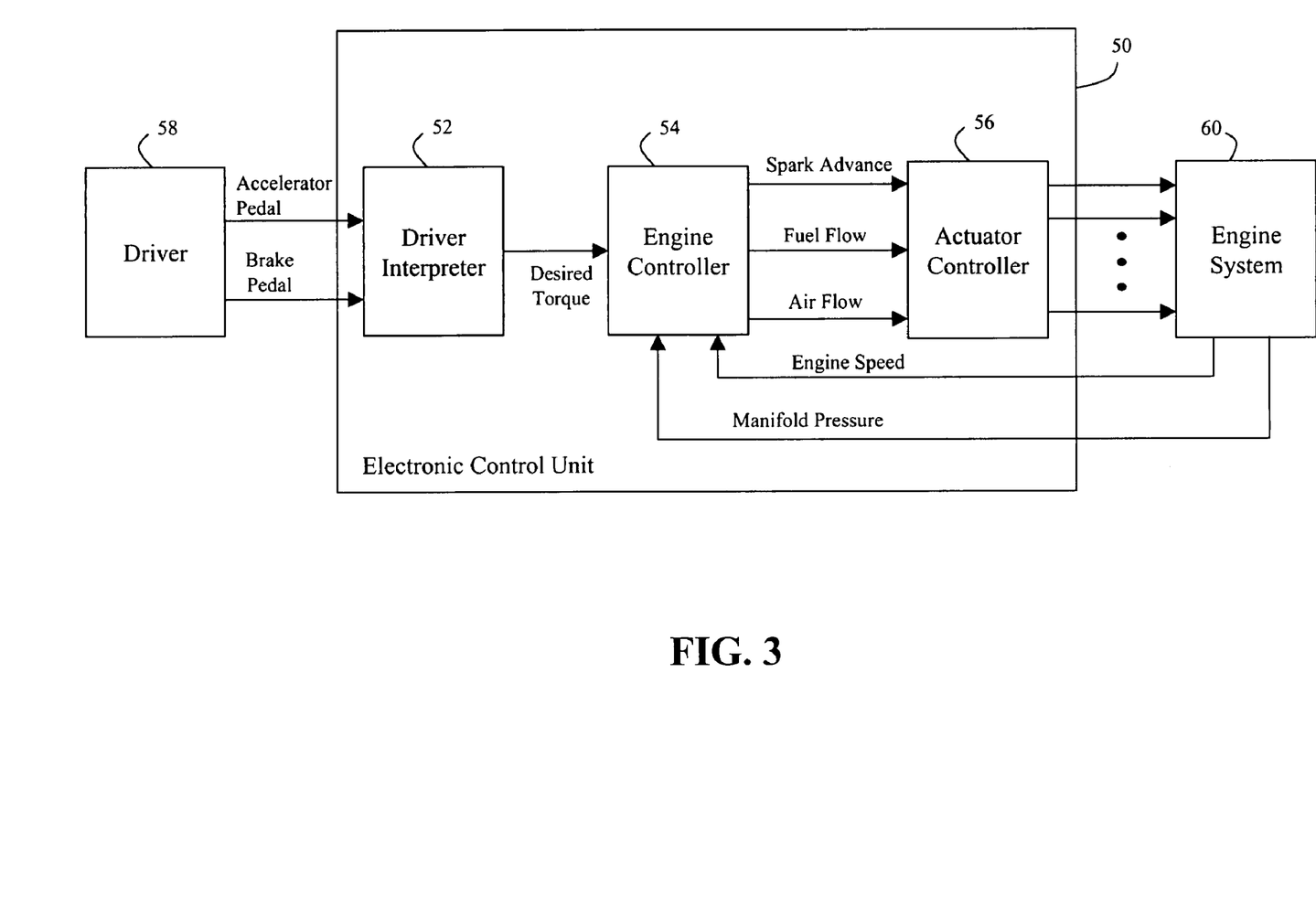
FIG. 3 is a block diagram of an electronic control unit that has driver inputs and engine system outputs.

Referring to FIG. 3, traditionally, the engine control task within a vehicle has been built as a set of software running in a specially designed electronic control unit (ECU) 50. The ECU 50 may comprise of a driver interpreter 52, an engine controller 54, and an actuator controller 56 and may be connected to various input and output devices by a wire harness. The driver 58 of the vehicle expresses a desire for how much torque should be applied to the vehicle's drive wheels by manipulating various user interfaces such as an accelerator pedal and a brake pedal. The driver interpreter 52 of the ECU monitors the user interfaces and determines how to how much torque is being requested. The engine controller 54 then determines how to set the various actuators on the engine to generate the desired torque. Specific commands are given to the actuator controller 56 that causes the actual actuators in an engine system 60 to operate. Information from sensors on the engine system 60 is then fed back to the engine controller 54 to modify its behavior. Further information on conventional engine control may be found in Trends in Engine Control, Terry Costlow, SAE Automotive Engineering, May 24, 2003.

One benefit of using a switch fabric network 22 is that it removes a specifically designed electronic control unit with dedicated engine control wire harnesses. In particular, in one embodiment of the present invention, the physical components of the traditional ECU discussed above may be broken into small, intelligent elements. Each of the input and output devices may then be connected to a communication switch node within the switch fabric network 22. This allows the elements to be connected together into a fabric of communication that is shared with other control systems within the vehicle 20. Additionally, the engine control system may separate the control software into elements with well defined layers which are distributed throughout the nodes in the network. From the vantage point of a processing node for engine control, smart input and output devices may be redundantly connected to the processing node to assist in computing activities.

Figure 4:
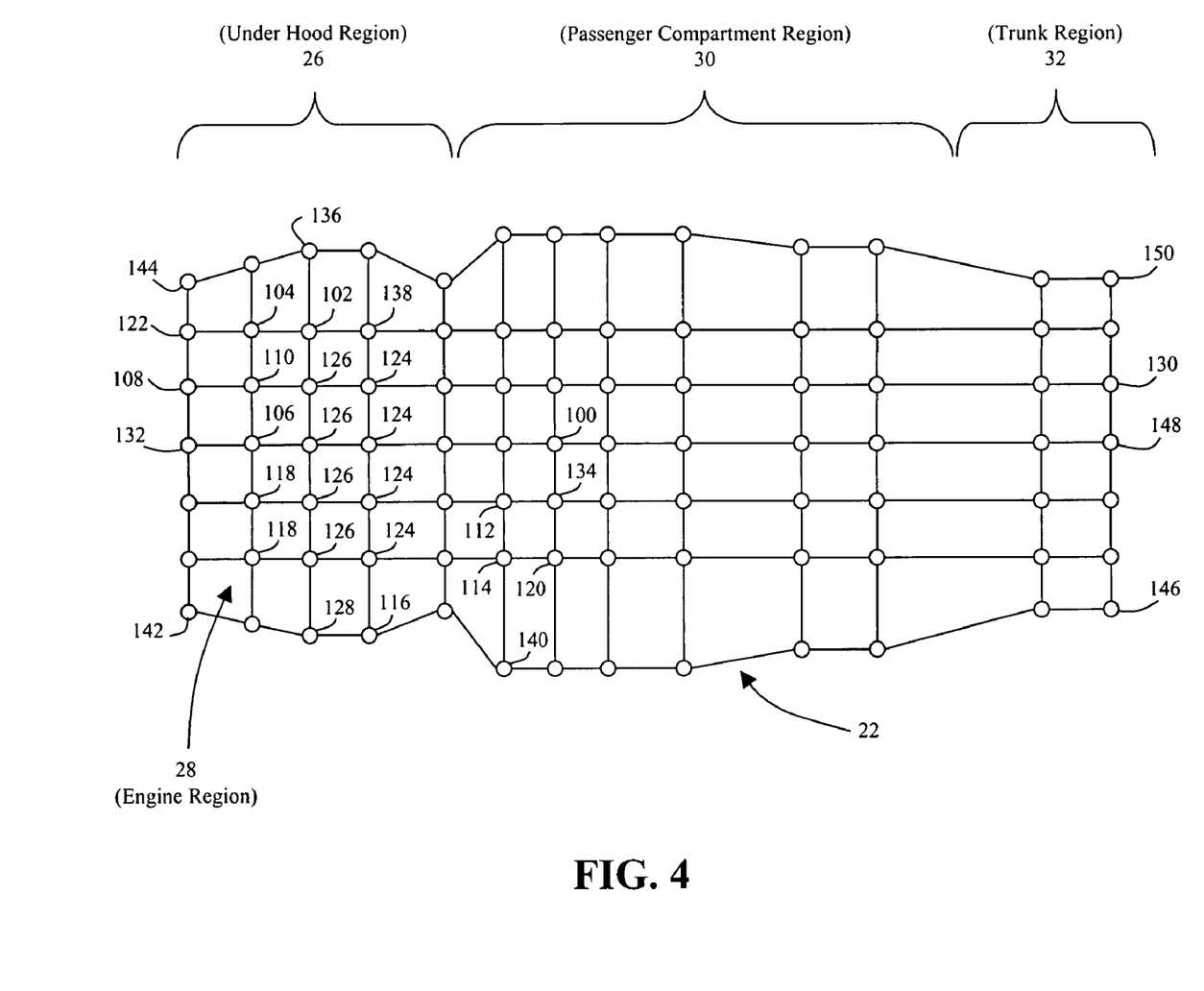
FIG. 4 is a topology of one embodiment of nodes in a switch fabric network that are distributed throughout the vehicle.

Table 1 and FIG. 4 illustrate an example of how certain input and output devices required for an engine processing node 100 in a spark ignited engine may be distributed throughout a switch fabric network 22. In particular, the first two columns of Table 1 give an exemplary list of specific input and output devices that may be monitored or controlled by the engine processing node 100 of a spark ignited engine. The third column of Table 1 identifies exemplary nodes in the switch fabric network 22 (FIG. 4) that may comprise of, or be attached to, the associated input or output devices.

| Type | Description | Number |
|---|---|---|
| Input Device | Crank Angle Sensor | Node 102 |
| Input Device | Cam Phase Sensor | Node 104 |
| Input Device | Air Temperature Sensor | Node 106 |
| Input Device | Coolant Temperature Sensor | Node 108 |
| Input Device | Manifold Air Pressure Sensor | Node 110 |
| Input Device | Accelerator Pedal Position Sensor | Node 112 |
| Input Device | Brake Pedal Position Sensor | Node 114 |
| Input Device | Vehicle Speed Sensor | Node 116 |
| Input Device | Oxygen Sensors (2) | Node 118 |
| Input Device | Ignition Switch Sensor | Node 120 |
| Input Device | Battery Voltage Sensor | Node 122 |
| Output Device | Fuel Injectors (4) | Node 124 |
| Output Device | Ignition Coils (4) | Node 126 |
| Output Device | Purge Valve | Node 128 |
| Output Device | Fuel Pump | Node 130 |
| Output Device | Coolant Fan | Node 132 |
| Output Device | Tachometer | Node 134 |
| Output Device | Diagnostic Port | Node 136 |
| Output Device | Throttle Butterfly | Node 138 |

In addition to possible nodes associated with input and output devices for the engine processing node 100 of a spark ignited engine, FIG. 4 also shows some elements of another vehicular control system—an exterior lighting control system—to illustrate that the switch fabric network 22 may be used as a unified medium for all control purposes in the vehicle 20. In this example, the exterior lighting control system contains a lamp processing node 140 and the following output devices: a front left lamp associated with a node 142; a front right lamp associated with a node 144; a left rear brake lamp associated with a node 146; a center brake lamp associated with a node 148; and a rear brake lamp associated with a node 146.

One problem to consider when applying a mesh-type network within a vehicle is handling events. The present invention includes a mechanism for assisting in coordinating parameters associated with a switch fabric network 22 in a vehicle 20. The mechanism includes the use of vehicle parameters to assist in handling events. In one embodiment, and for purposes of illustration, the vehicle parameter angle of rotation of the engine's crank shaft is used in the following examples in the switch fabric network 22 to handle events. Other embodiments may use multiple parameters such as but not limited to time and angle of rotation of the engine's crank shaft. As described below, tasks and events may then be scheduled to occur at certain angles of rotation.

For purposes of illustrating some of the advantages of the present invention, the engine control architecture described above will be used initially. Referring to FIG. 4, in one embodiment, the process may be used to sample the condition of the engine at a specific point in the rotation of the engine's crank shaft (associated with node 102), and then update the state of actuators in the engine at another specific point in the rotation of the crank shaft.

In this example, an engine control application runs in a processing node 100 somewhere in the network. The application may be configured to use information from a variety of sensors that gather their samples at a specific angle of rotation after a firing event. The specific angle of rotation is with respect to a fixed reference angle. The application makes a decision about the state of the actuator that it controls and sends a command so that the actuator will be changed at a certain angle of rotation before the next firing event.

Within this framework, it is desired that all input devices (e.g., sensors), processing devices, and output devices (e.g., actuators) in the process to have knowledge of the angle of rotation of the engine. The input and output devices may obtain information on the angle of rotation of the engine over the switch fabric network 22 through the node 24 associated with the crank angle sensor. Crank angle sensors typically look at a wheel with regularly spaced teeth attached to the engine's crank shaft. Often there is a special tooth pattern such as one or two missing teeth that can be used to determine the absolute angle of rotation. In this embodiment, an application running in the node 102 associated with the crank angle sensor will update all of the other nodes in the network interested in crank angle every time that it senses the next tooth on the wheel. On the receiving end, each of the receiving nodes will have a local time-based model of the engine that would keep track of the angle of rotation between updates from the node 102 associated with the crank angle sensor.

Figure 5:
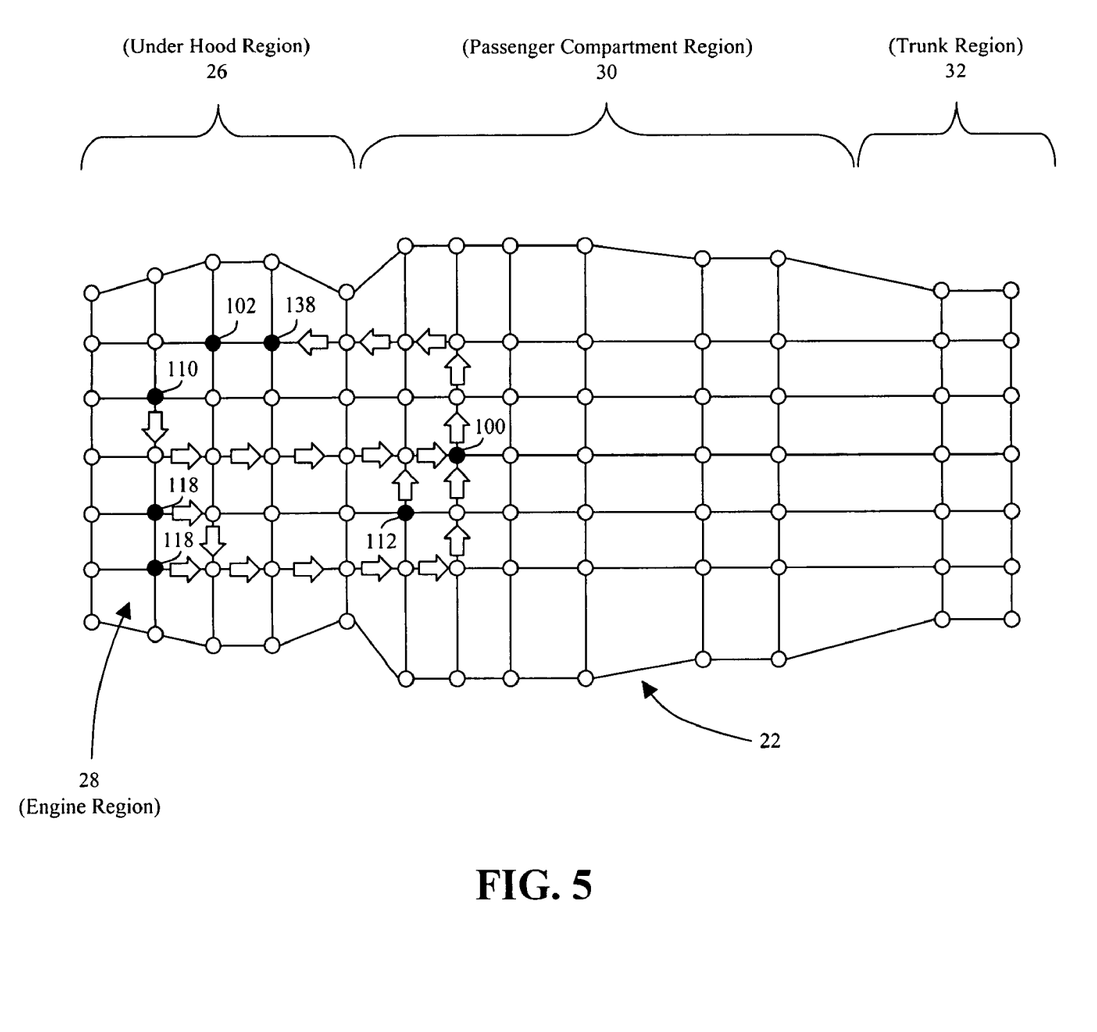
FIG. 5 is a diagram illustrating one exemplary flow of data packets through the topology shown in FIG. 4.
Figure 6:
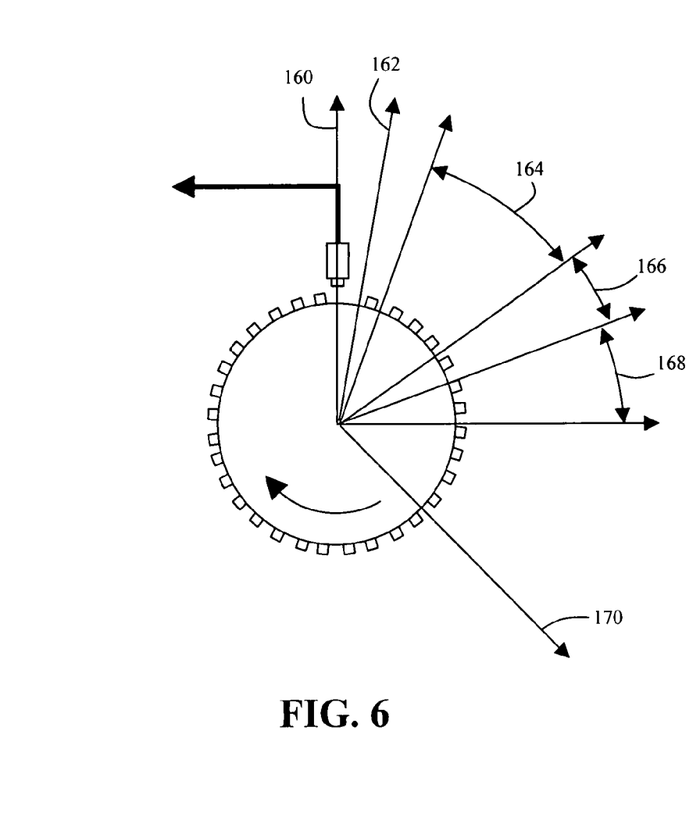
FIG. 6 is a diagram illustrating a method of steps that may take place in one embodiment associated with controlling an engine system.
Figure 7:
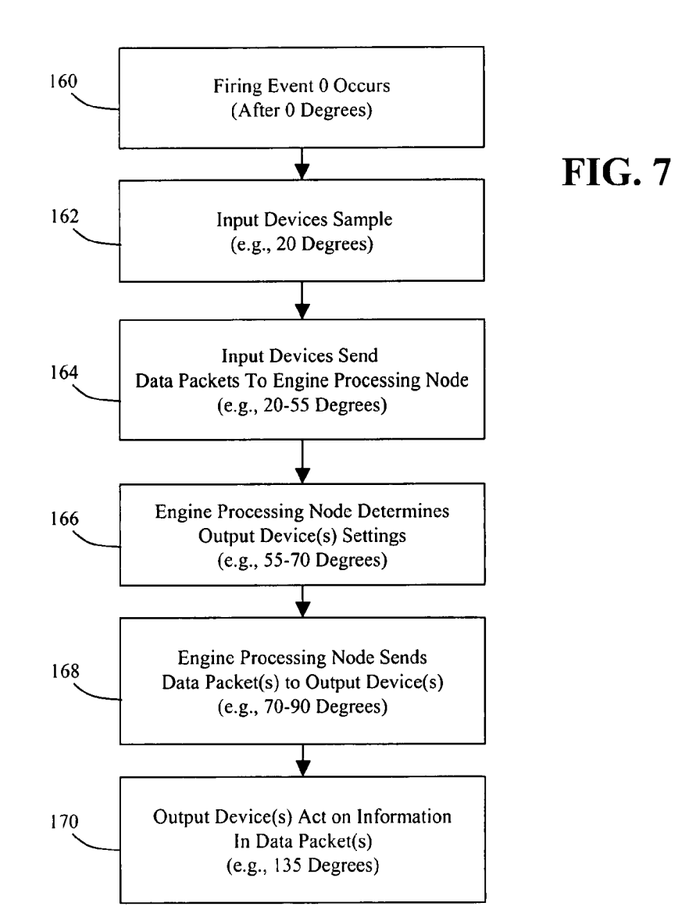
FIG. 7 is a flow diagram that further describes the exemplary method in FIG. 6.

For purposes of illustrating this further, referring to FIG. 5, assume that an engine processing node 100 needs communication with three input devices and one output device. Also assume for purposes of illustration that the input devices are a manifold pressure sensor associated with a sensing node 110, an accelerator pedal sensor associated with another sensing node 112, and an oxygen sensor(s)

associated with a further sensing node(s) 118. The output device may be an actuator for a throttle butterfly associated with an actuator node 138. FIGS. 6 and 7 further illustrate a method of how such an example may be used in the context of the present invention using a vehicular switch fabric network 22.

At step 160, it is assumed that a spark plug firing will occur sometime after the reference angle of 0 degrees on the crank shaft. In step 162, the input devices associated with nodes 110, 112, and 118 are configured to sample data at some specific point in the rotation of the engine's crank shaft after the spark plug firing (e.g., at 20 degrees). At step 164, the input devices will then generate data packets and transmit the data packets into the switch fabric network 22. Each of the data packets from the input devices contains the value sampled and the angle at which it was sampled. The sampled data within the data packets will arrive at the processing node 100 during an angular period of the crank shaft (e.g., between 20–55 degrees). Depending on the speed of the communication links between the nodes and the criticality of the data being transmitted, it may be necessary to give more critical engine sensing data packets priority in the network 22 so that they would travel first ahead of other low priority traffic. Additionally, the engine region 28 of the switch fabric network 22 may be designed a restricted zone in the overall strategy so that other communication packets would not be routed through the region.

At step 166, an application in the processing node 100 will use the values sampled and the angles at which they were sampled to make a determination of any new settings for any output devices. This step may occur during another angular period of the crank shaft (e.g., 55–70 degrees). In the example above, this would mean that the application in the processing node 100 may determine a new setting of the butterfly throttle associated with the actuator node 138. Then, in step 168 and at a later angular period of the crank shaft (e.g., 70–90 degrees), the application in the processing node 100 would then send a control data packet toward the actuator node 138 associated with the butterfly throttle in advance of when it is expected to be used. Again, depending on the speed of the communication links between the nodes and the criticality of the data being transmitted, it may be necessary to give more critical engine control data packets priority in the network 22 so that they would travel first ahead of other low priority traffic. In any event, the transmitted data packet would contain the new state of the actuator associated with the butterfly throttle and the angle of rotation at which the actuator should be updated (e.g., 135 degrees). When the command packet arrives at the actuator node 138 associated with the butterfly throttle, as shown in step 170, the actuator will then schedule and act on the information in the data packet when the crank shaft reaches the requested angle of rotation.

Figure 8:
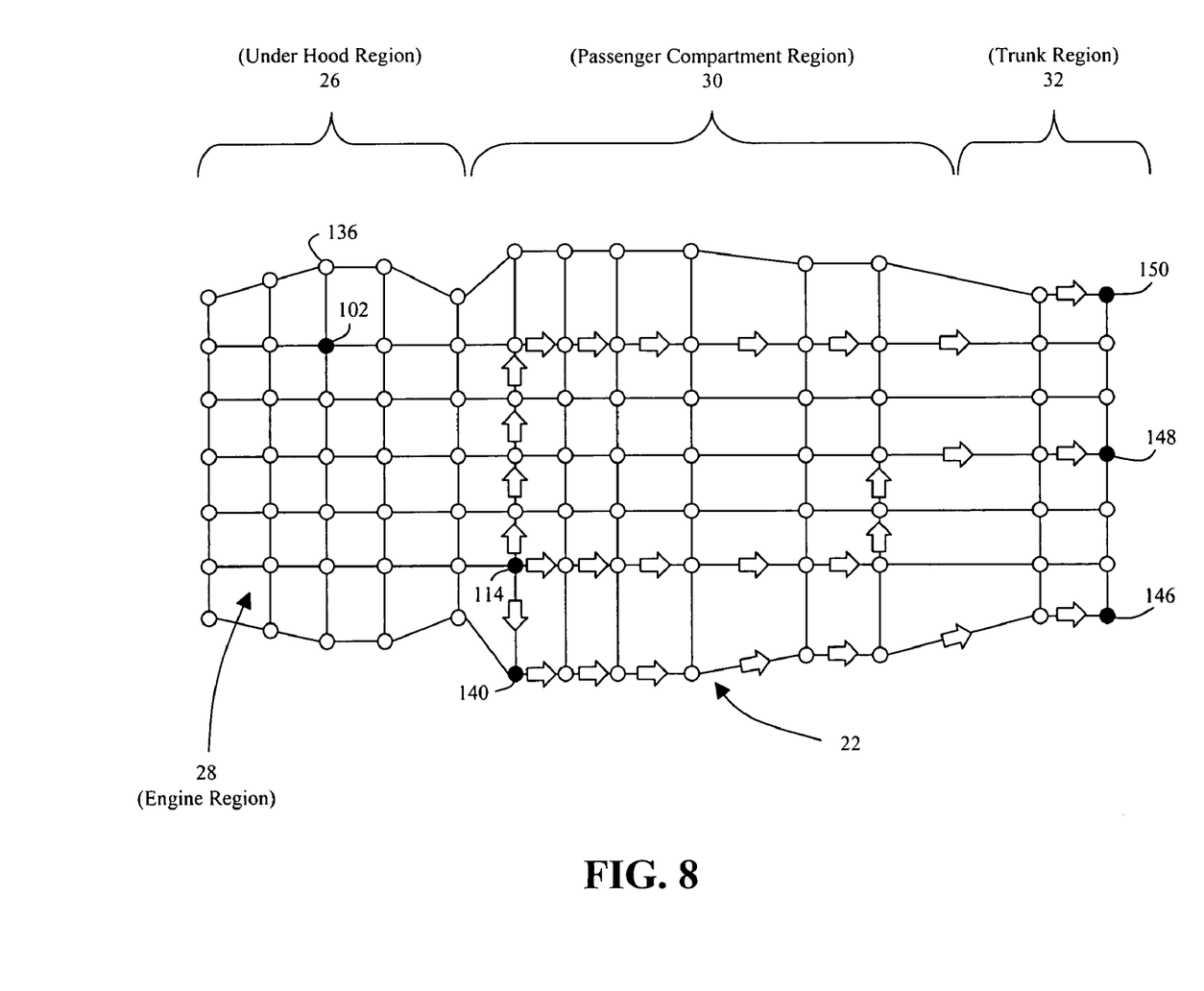
FIG. 8 is another embodiment of an exemplary flow of data packets through the topology shown in FIG. 4.

For further purposes of illustrating the advantages of the present invention, another control system will be described in the context of the present invention. Referring to FIG. 8, in one embodiment, the process may be used in a lamp processing node 140 to receive a condition of the brake pedal (associated with node 114) at a specific point in the rotation of the engine's crank shaft, and then activate a series of lamps in the trunk region 32 of the vehicle 20.

In this example, a lamp control application runs in the lamp processing node 140 somewhere in the network. The application may be configured to use information from a brake light at a specific angle of rotation after a firing event. The specific angle of rotation is with respect to a fixed reference angle. The application would then make a decision about whether to activate the lamps in the trunk region 32 of the vehicle 20. If the rear lamps need to be activated, the application in the lamp processing node 140 would send a series of command data packets to the nodes 146, 148, 150 associated with the rear lamps and direct them to all change at a certain angle of rotation.

Within this framework, it is desired that all input, processing, and output devices in the process—the brake pedal sensor, the controller, and the lamp actuators—to have knowledge of the angle of rotation of the engine. The input and output devices may obtain information on the angle of rotation of the engine over the switch fabric network 22 through the node 102 associated with the crank angle sensor or through an independent medium as explained in United States patent application entitled "Method and Apparatus for Time Synchronizing an In-Vehicle Network," Ser. No. 10/424,644, Publication No. US 20040213295, filed Apr. 28, 2003. In this embodiment, an application running in the node 102 associated with the crank angle sensor will update all of the other nodes in the network interested in crank angle every time that it senses the next tooth on the wheel. On the receiving end, each of the receiving nodes will have a local time-based model of the engine that would keep track of the angle of rotation between updates from the node 102 associated with the crank angle sensor.

Figure 9:
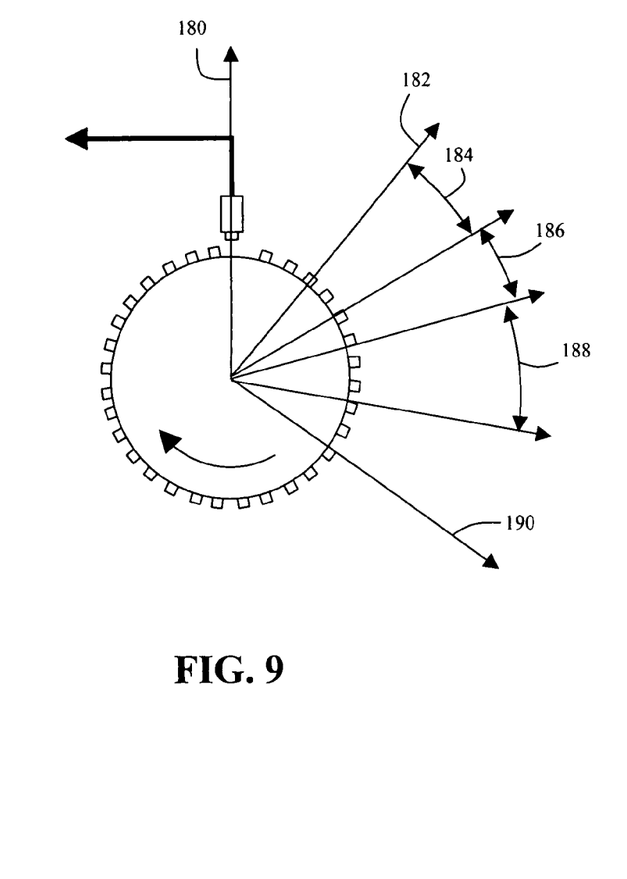
FIG. 9 is a is a diagram illustrating another method of steps that may take place in another embodiment associated with controlling a lighting system.
Figure 10:
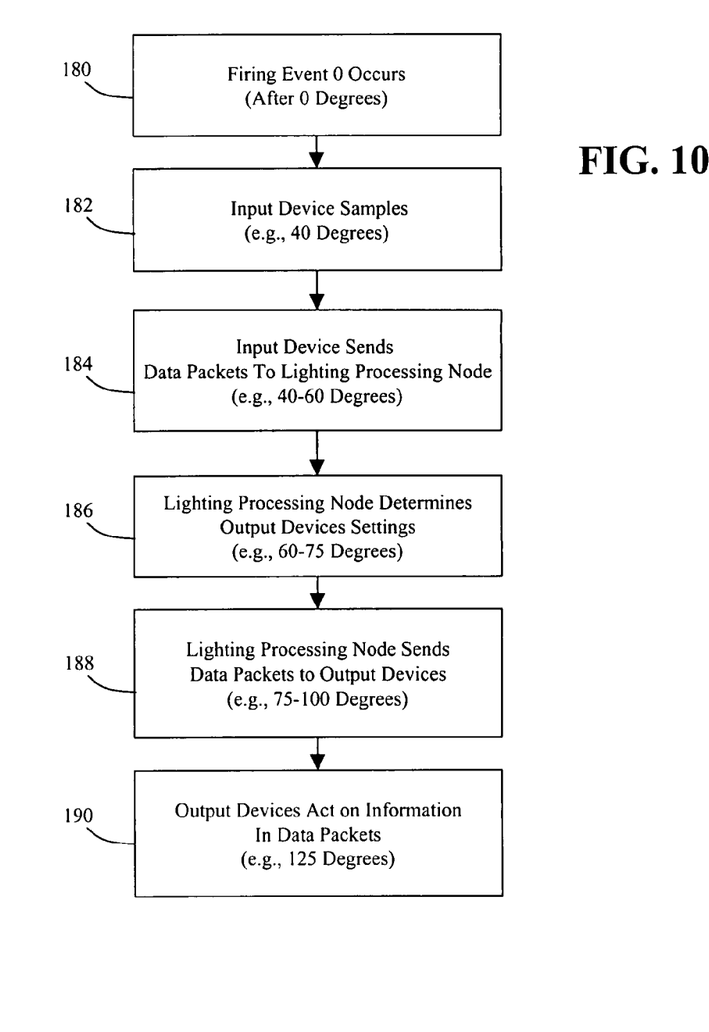
FIG. 10 is a flow diagram that further describes the exemplary method in FIG. 9.

FIGS. 9 and 10 further illustrate a method with a lighting control system. At step 180, it is assumed that a driver will activate the brake sensor (the input device to the lamp processing node 140) sometime after the reference angle of 0 degrees on the crank shaft. In step 182, the input device associated with node 114 may be configured to sample data based on a state or a level of the sensor (event based) or at some specific point in the rotation of the engine's crank shaft (periodic) (e.g., at 40 degrees). At step 184, the input device will then generate a data packet and transmit the data packet into the switch fabric network 22. Each of the data packets from the input devices contains the value sampled and the angle at which it was sampled. The sampled data within the data packets will arrive at the processing node 140 during an angular period of the crank shaft (e.g., between 40–60 degrees).

At step 186, an application in the processing node 140 will use the value sampled and the angle at which it was sampled to make a determination of whether to activate the rear lamps through nodes 146, 148, and 150. This step may occur during another angular period of the crank shaft (e.g., 60–75 degrees). Then, in step 188 and at a later angular period of the crank shaft (e.g., 70–90 degrees), the application in the processing node 140 would then send a control data packet toward the actuator nodes 146, 148, and 150 associated with the rear lamps in advance of when it is expected to be used. The transmitted data packet would contain the new states of the actuators associated with the lamps and the angle of rotation at which the actuators should be updated (e.g., 125 degrees). When the command packet arrives at the actuator nodes 146, 148, and 150 associated with the rear lamps, as shown in step 190, the actuator will then schedule and act on the information in the data packet when the crank shaft reaches the requested angle of rotation.

Figure 11:
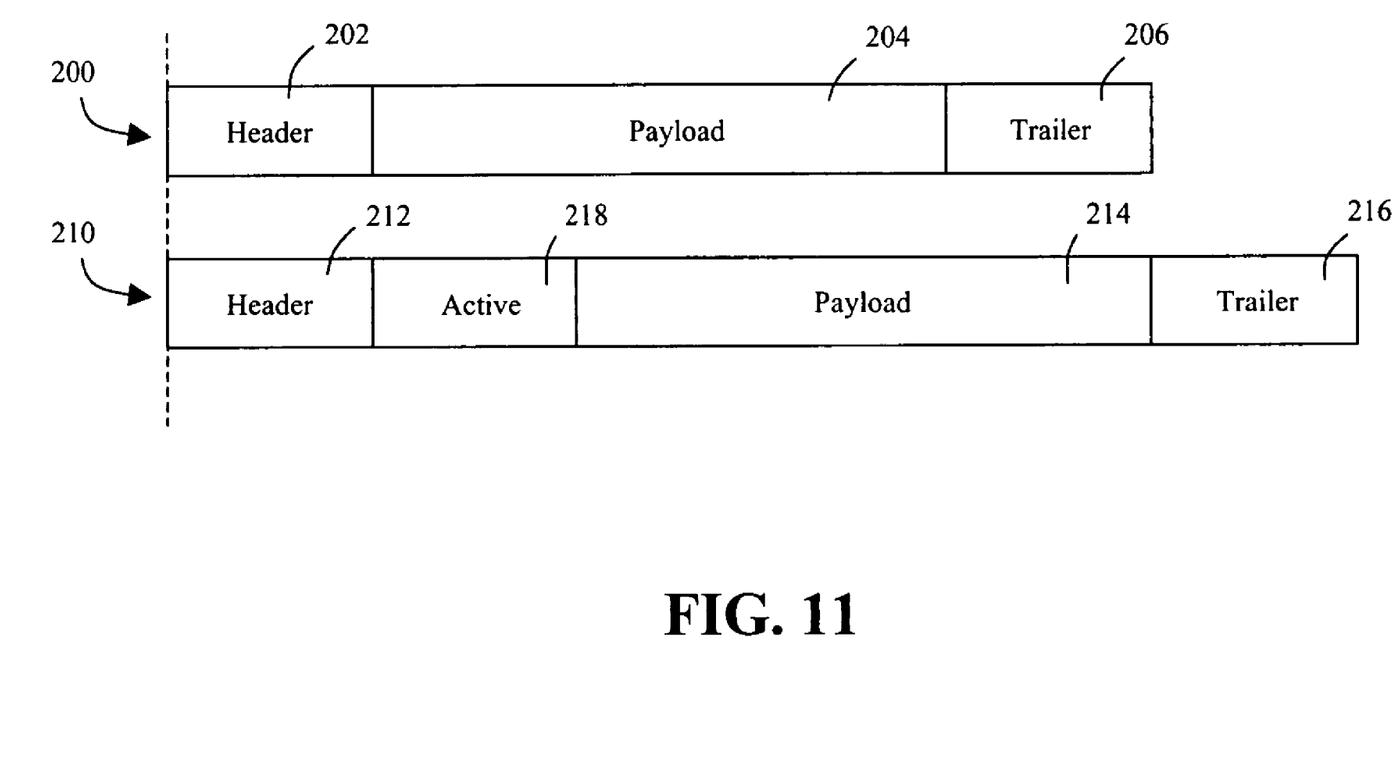
FIG. 11 is a block diagram of some example embodiments of the data packets that may travel through a vehicular switch fabric network.

FIG. 11 illustrates example embodiments of data packet configurations that may be used in connection with switch fabric network 22 discussed above. As described, the individual links between nodes 24 in the network 22 may be configured to operate in accordance with TCP/IP, ATM, RapidIO, Infiniband and other suitable communication protocols. These data packets include structure to conform to the standard required. In one embodiment, a data packet for this invention may include a data packet 200 having a header portion 202, a payload portion 204, and a trailer portion 206. The header portion 202 may contain a start of frame pattern and routing information for the data packet. In the case of input devices, the generated data packets may include, in their payload portion 204, the value sampled and the angle at which it was sampled. In the case of a processing device, the generated packets may include, in their payload portion 204, a new actuator setting and an angle at which the new setting should take place. The trailer portion 206 may contain an end of frame pattern.

In another embodiment, a data packet 210 includes along with a header portion 212, payload portion 214, and trailer portion 216 an active portion 218. The active portion 218 may act as a marker that assists in the coordination process. The marker may be dynamically used in the coordination process. In such an embodiment, as the data packet 210 moves from node to node, each node may modify or update the active portion 218 to add an offset to the value in the payload that corresponds to the additional angle of rotation for use by the processing node in making determinations on future actions. The benefit of having the active portion 218 gather information on offsets is that a processing node may further compute or calculate a crank shaft rotation offset between itself and any other node on the network 22.

The active portion 218 of the data packet 210 may also be used to messenger data unrelated to the payload within the network 22, track the communication path taken by the data packet through the network 22, provide configuration information (route, timing, etc.) to nodes 24 of the network 22, provide functional data to one or more devices coupled to the network 22 or provide receipt acknowledgement. Other arrangements of the data packets for use with the present invention may be envisioned by those of ordinary skill in the art having the benefit of this disclosure.

What has been described is a system and method for coordinating control parameters in a switch fabric network for a vehicle. An application in a processing node receives sampled data from sensors over the switch fabric network. The sampled data may be associated with a value of a vehicle parameter such the rotation of a crank shaft in the vehicle. The application uses that information to make a determination whether an actuator, in a different part of the switch fabric network, needs a new setting. If so, the application generates a command data packet and transmits the command data packet over the switch fabric network. The command data packet includes the new setting along with a value of the vehicle parameter when the new setting is to occur in the actuator. A node associated with the actuator receives the data packet and acts on the information in the command data packet based on the value of the vehicle parameter within the data packet. The above description of the present invention is intended to be exemplary only and is not intended to limit the scope of any patent issuing from this application. The present invention is intended to be limited only by the scope and spirit of the following claims.

What is claimed is:

1. A communication network in a vehicle comprising:
   a plurality of interconnecting nodes joined together by communication links for the transmission of data packets there between;
   a processing node including a processor and a memory, the processing node adapted for receiving and transmitting data packets over the interconnecting nodes to control a vehicular subsystem; and
   an actuator node associated with an actuator of the vehicular subsystem, the actuator node in communication with the processing node over the interconnecting nodes;
   wherein the processing node determines a new setting of the actuator based on sampled data and determines a value of a vehicle parameter when the new setting is to occur in the actuator.

2. The communication network in claim 1, wherein the vehicle parameter is the angle of rotation of the crank shaft in a vehicle's engine.

3. The communication network in claim 1, wherein the sampled data occurs in a sensing node that is associated with a vehicular sensor, the sensing node further associating the sampled data to another value of the vehicle parameter.

4. The communication network in claim 1, wherein the vehicular subsystem is an engine control system.

5. The communication network in claim 4, wherein the actuator is associated with a vehicular device selected from a group consisting of a fuel injector, an ignition coil, a purge valve, a fuel pump, a coolant fan, a tachometer, a diagnostic port, and a throttle butterfly.

6. The communication network in claim 1, wherein the vehicular subsystem is a lighting control system.

7. The communication network in claim 6, wherein the actuator is associated with a vehicular lamp.

8. A method for coordinating parameters in a vehicular switch fabric network, the vehicular switch fabric network comprising a plurality of interconnected nodes that allow for the transmission of data packets there between, the method comprising the steps of:
   sampling data and associating the sampled data to a first value of a vehicle parameter;
   determining a new setting of an actuator based on the sampled data and determining a second value of the vehicle parameter when the new setting is to occur in the actuator;
   generating a command data packet and transmitting the command data packet to a node in the vehicular switch fabric network associated with the actuator, the command data packet including the new setting and the second value of the vehicle parameter; and
   establishing the new setting in the actuator when the second value of the vehicle parameter occurs.

9. The method in claim 8 wherein the vehicle parameter is the angle of rotation of the crank shaft in a vehicle's engine.

10. The method in claim 8 wherein the sampled data and the association of the sampled data to the first value of the vehicle parameter occurs in a node of the switch fabric network that is associated with a vehicular sensor.

11. The method in claim 8 wherein the steps of determining a new setting of an actuator, determining a second value of the vehicle parameter, and generating a command data packet occur in a processing node associated with an engine control system.

12. The method in claim 8 wherein the steps of determining a new setting of an actuator, determining a second value of the vehicle parameter, and generating a command data packet occur in a processing node associated with a lighting control system.

13. The method in claim 8 wherein the actuator is associated with a vehicular device selected from a group consisting of a fuel injector, an ignition coil, a purge valve, a fuel pump, a coolant fan, a tachometer, a diagnostic port, and a throttle butterfly.

14. The method in claim 8 wherein the actuator is associated with a vehicular lamp.

15. A method for coordinating parameters in a vehicular switch fabric network, the vehicular switch fabric network comprising a plurality of interconnected nodes that allow for the transmission of data packets there between, the method comprising the steps of:
- sampling data and associating the sampled data to a first value of a vehicle parameter;
- broadcasting the sampled data and the first value of the vehicle parameter over the switch fabric network;
- determining, in a processing node, a new setting of an actuator based on the sampled data and determining a second value of the vehicle parameter when the new setting is to occur in the actuator;
- transmitting the new setting and the second value of the vehicle parameter to an actuator node in the switch fabric network that is associated with the actuator; and
- establishing, in the actuator node, the new setting when the second value of the vehicle parameter occurs.

16. The method in claim 15 wherein the vehicle parameter is the angle of rotation of the crank shaft in a vehicle's engine.

17. The method in claim 15 wherein the processing node is associated with an engine control system.

18. The method in claim 17 wherein the actuator is associated with a vehicular device selected from a group consisting of a fuel injector, an ignition coil, a purge valve, a fuel pump, a coolant fan, a tachometer, a diagnostic port, and a throttle butterfly.

19. The method in claim 15 wherein sampled data is broadcast over the switch fabric network using data packets, the data packets having a portion that includes the sampled data.

20. The method in claim 19 wherein the interconnected nodes store and use the broadcasted sampled data to handle a vehicular event.

* * * * *